United States Patent
Hehl

(10) Patent No.: US 8,751,032 B2
(45) Date of Patent: Jun. 10, 2014

(54) METHOD FOR THE INTERACTIVE CONTROL OF A MACHINE

(76) Inventor: Karl Hehl, Lossburg (DE)

( * ) Notice: Subject to any disclaimer, the term of this patent is extended or adjusted under 35 U.S.C. 154(b) by 351 days.

(21) Appl. No.: 12/747,486

(22) PCT Filed: Dec. 18, 2008

(86) PCT No.: PCT/EP2008/010866
§ 371 (c)(1), (2), (4) Date: Jun. 10, 2010

(87) PCT Pub. No.: WO2009/080296
PCT Pub. Date: Jul. 2, 2009

(65) Prior Publication Data
US 2010/0274379 A1 Oct. 28, 2010

(30) Foreign Application Priority Data
Dec. 20, 2007 (DE) .................. 10 2007 062 692

(51) Int. Cl.
*G06F 19/00* (2011.01)
*B29C 45/03* (2006.01)

(52) U.S. Cl.
USPC ........................ 700/103; 700/200

(58) Field of Classification Search
USPC ................. 700/103, 104, 197–205
See application file for complete search history.

(56) References Cited

U.S. PATENT DOCUMENTS

| | | | | |
|---|---|---|---|---|
| 5,539,650 A | * | 7/1996 | Hehl | 700/200 |
| 2008/0065261 A1 | * | 3/2008 | Grimm et al. | 700/200 |
| 2009/0319067 A1 | * | 12/2009 | Betsche | 700/97 |

FOREIGN PATENT DOCUMENTS

| | | |
|---|---|---|
| DE | 10246925 | 4/2003 |
| DE | 102005023919 | 11/2006 |
| EP | 0573912 | 12/1993 |
| JP | 61102227 | 5/1986 |
| WO | 2008061910 | 5/2008 |

OTHER PUBLICATIONS

International Search Report; PCT/EP2008/010866; Jun. 3, 2009.

* cited by examiner

*Primary Examiner* — Ryan Jarrett
(74) *Attorney, Agent, or Firm* — Cantor Colburn LLP

(57) ABSTRACT

The invention relates to a method for the interactive control of a machine (14), wherein the operating parameters required for the work flow (18) of the machine are input into a data processing unit (12) storing the operating parameters in a form that guides the operator. Due to the input, subsequently work flows are carried out. A data set regarding the basic rules of the work flow of the machine is present in the data processing unit. Using the data set, a chosen selection of possibilities existing based on the machine equipment and environment is provided to the operator as the result, which contains further sections that can be inserted into the existing work flow (18) in a compatible manner. Due to the fact that an action is carried out based on an initial state present on the machine, at the end of which the machine is in a current state, and that said current state or the change between the initial state and the new current state that has occurred is taught, verified, and added to the new current state via a teaching unit (20) as a new component for transfer into the work flow of the machine to be programmed, wherein a logic examination of the action is already carried out for the operability thereof during the action, the method is further improved in that the compilation of a flow is facilitated, even having little knowledge of the control.

14 Claims, 2 Drawing Sheets

METHOD FOR THE INTERACTIVE CONTROL OF A MACHINE

CROSS REFERENCE TO RELATED APPLICATION

The present application claims the priority of German patent application 10 2007 062 692.6, filed on Dec. 20, 2007, the entire content of which is hereby incorporated by reference.

TECHNICAL FIELD

The invention relates to a method for the interactive control of a machine, and in particular a plastics injection molding machine.

BACKGROUND

A method of this type is known from EP 0 573 912 B1. A knowledge base or a data set containing the basic rules for the operation of an injection molding machine is loaded into a data processing unit. In addition, the machine detects the current machine configuration and the environment thereof such as e.g. peripheral devices and offers the machine setter a sequence editor for producing an operational sequence for the machine. Based upon the knowledge existing in the data processing unit in regard to the operational sequences and the machine, only a selected collection of the possible input commands, which are preferably presented visually on a monitor screen, is ever put at the disposal of the operator during his input session, these commands representing further sections of the operational sequence which are compatible with the machine and the injection mold and which are arranged to be inserted into the currently running operational sequence. In order to be accepted in the operational sequence being programmed. Each input command is fed into the control system and checked in regard to its plausibility. The process of inputting operational sequences can be simplified and facilitated in this way. A comparable method is known from DE 102 46 925 B4.

From DE 10 2005 023 919 A1, a method is known for optimizing the operational sequence of an injection cycle of an injection molding machine, wherein actions are undertaken directly on parts of the injection molding machine and the resultant change in the position of the parts is taught by means of a teaching unit for the purposes of adoption thereof in the programming of the sequence of operations of the machine.

BRIEF SUMMARY

On the basis of this state of the art, invention improves a method for the interactive control of a machine in such a way that the establishment of an operational sequence is facilitated even with little knowledge of the control system.

On the basis of the logical background test known from the state of the art and providing a default selection of the possible subsequent steps and the known 'teaching process', based upon the starting state currently existing in the machine, an action is implemented by the intervention of an operator which was preferably triggered by the machine control system so that, at the end of this process, the machine is in a new actual state. This actual state or the change that has occurred between the starting state and the actual state is taught by means of a teaching unit for the purposes of adopting it in the sequence of operations of the machine that is to be programmed where it is added in as a new component. This is effected in conjunction with the machine control system in such a way that not only the further possibilities of implementation for this actual state are checked and made available, but a logical test on the action is effected as soon as a function is initiated by the activation of the manual trigger for the action such as e.g. a position that is to be reached e.g. by control keys. Preferably thereby, before the action is implemented, the intended action is checked so that it will be only partially implemented or not implemented at all and the illogical command part of the action will not even be permitted, i.e. only insofar as the logical check in the background permits this. Thus for example, during a teaching process, a handling system will not be permitted to proceed into a closed mold although the movement prescribed for this action will be permitted to a partial extent e.g. movement up to the mold.

It thus becomes possible not only to specify especially external operational sequences of the injection molding machine but equally well the internal ones such as e.g. injection molding unit, mold closing unit or peripheral equipment such as e.g. handling systems or mounting devices not only by functional placement using symbols and positions using coordinates, but the corresponding positions can be moved to manually in accordance with the logical consistency thereof and then be adopted in the operational sequence using a logical test in regard to the possibility of this position.

Preferably at least one component of the machine or its peripheral equipment is brought manually into a certain position and, when this machine component has arrived at the desired position, this fact is confirmed or acknowledged in relation to the machine control system. Utilizing this location, the machine transfers the operating parameters for this position into the operational sequence and suggests further plausible operations on the basis of this confirmed position. The transfer into the actual state can also be effected by means of a functional movement in that the target values are entered by means of an input unit.

To this end, in the basic operational sequence of the machine or in a currently established partial operational sequence of the input for the operational sequence, the machine is brought into a starting state, i.e. into the position from where on it is to be taught. This starting state is flagged in the machine control system as being the starting point for the following teaching process. Then, in the teaching mode, an action can be implemented manually in the machine using different axes or actuators in such a way as is permitted by the logical check on the operational sequence of the machine. When e.g. paths are entered, the control system notes the sequence and the positions of the axes and actuators (and also the final end positions) that have been arrived at manually and inserts them, with an acknowledgement/adoption instruction, logically and appropriately arranged into the operational sequence of the machine or the operational sequence of the peripheral equipment and also presents this information graphically on a control panel or a display unit.

Preferably, in the case of a plastics injection molding machine, a programmed operational sequence for a cycle is already known for the control system or the machine. On the basis of this state, an override position can then be determined in which, in the course of a "teach in" process, the desired action can be taught by manual activation or by a functional movement using a keyboard. The various forms of implementation that are possible from this position are checked preferably with regard to the following and also the preceding steps of the operational sequence insofar as a logical plausibility check has first taken place as to whether this step is possible at this position. Equally however, one could just as well begin with a teaching process as a first step in order to develop the entire operational sequence thereon.

Further advantages are apparent from the appending Claims and the following description.

BRIEF DESCRIPTION OF THE DRAWINGS

In the following, the invention will be described in greater detail on the basis of an exemplary embodiment. In the drawing.

DETAILED DESCRIPTION

Figure 1:
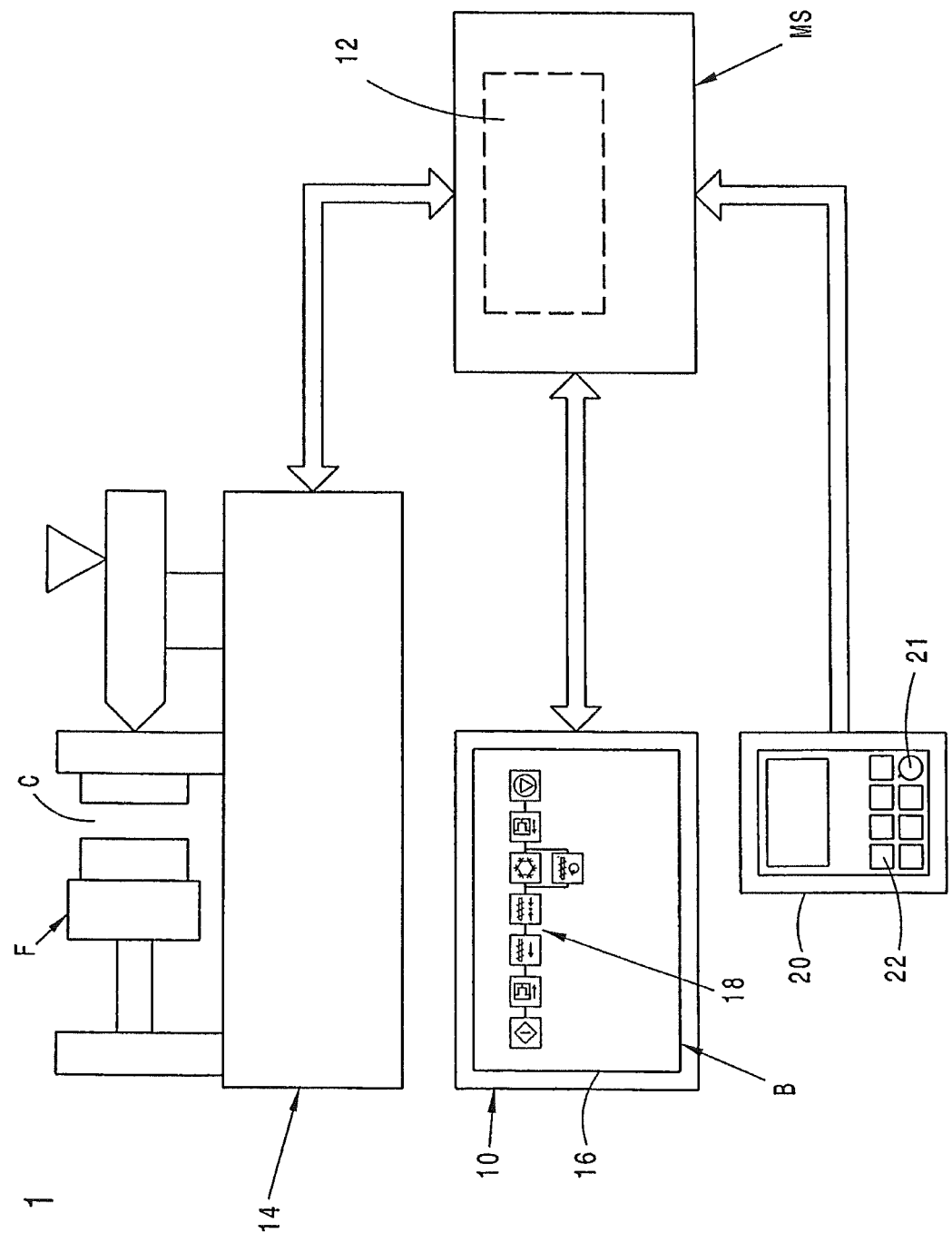
FIG. 1 shows a block circuit diagram of an injection molding machine equipped with a control system in accordance with the invention, FIGS. 2, 3 an illustration of a handling system using an enlarged section of an injection molding machine in the region of the mold cavity in the course of a process for teaching a movement or change of position.

Before the invention is described in detail, it should be pointed out that the invention is not restricted to the particular components of the device or the particular method steps since these components and methods can vary. The terms used here are only intended to describe certain special embodiments and are not used in a restrictive manner. Moreover, if the singular or indefinite articles are used in the description or in the Claims then this also refers to a plurality of these elements insofar as the general context does not make it unambiguously clear that something else is meant.

The invention will now be described in more detail in exemplary manner with reference to the accompanying drawings. However, the exemplary embodiments relate only to examples which are not intended to restrict the inventive concept to a certain arrangement.

The term "axis" used in the following describes arbitrarily driven movement axes such as are used in machines 14 and in particular, in injection molding machines. Movement axes in injection molding machines are e.g. the nozzle driver, the injection process, the movement of a mold or the ejection process.

The Figures schematically depict a machine control system MS of a machine 14 which is an injection molding machine in the exemplary embodiment, preferably, a plastics injection molding machine for the processing of plastics and other plastifiable masses such as ceramic or metallic masses. The employment thereof in other machines is however quite possible. In the machine control system MS, there is provided a data processing unit 12 in which, on the one hand, a set of data for the basic rules of the sequence of operations of the machine is already stored and which is usually also provided with the basic rules of the technology for which the machine 14 is intended. On the other hand, the data processing unit 12 is connected to an input unit 10 and also to the machine 14, i.e. here, to the injection molding machine, in order to permit inputs e.g. regarding the operating parameters to be entered and to adapt to the way in which the machine is equipped and/or to the environment of the machine such as peripheral devices such as e.g. handling devices or mounting devices.

As a rule, the input unit 10 permits the operator to enter the operating parameters that are required for the sequence of operations of the machine in a form serving to guide the operator. The entered operating parameters are stored in the data processing unit 12. Thereafter, from these items of information and also from the items of information regarding the equipping of the machine and the environment thereof, one or more operational sequences 18 are carried out in accordance with the stored operating parameters.

These operational sequences may also comprise the starting and concluding processes of a machine operation or else the operational sequences of the machine's surroundings. These operational sequences could be continuous processes, such as e.g. when extruding as well as discontinuous processes such as e.g. the injection cycle of an injection molding machine or e.g. mounting processes for the peripheral equipment. Continuously displaceable machine and peripheral movement/axes for example can be included in these processes in just the same manner as the data from "digital actuators" or sensors such as e.g. limit switches on the axes which are intelligently identified by the machine in accordance with the machine configuration.

Following a plausibility check on his last input, the result is that the operator is offered, on the basis of the set of data in regard to the basic rules for the sequence of operations of the machine e.g. in regard to the injection molding process and the injection molding itself, a selected collection of possibilities for further steps which exist due to the machine equipment and the environment thereof. Thus, as soon as the operator enters a partial section of a sequence of operations 18, only those further sections of the operational sequence that are insertible in compatible manner into the existing sections of this sequence of operations are put at his disposal from then on. This method is known from EP 0 573 912 B1, the published content of which is incorporated by reference into the subject matter of the present application.

As a supplement or alternative to this process of entering data by means of the input unit 10, i.e. by the input of e.g. coordinates to which machine components of the system are then driven, there is now the possibility of implementing an action such as e.g. moving one or more components or units of the machine or its peripheral equipment to a certain position and confirming the position of the component at this location by means of a "teach in". The teaching unit 20 possesses keys 22 that can be used e.g. for initiating the movement of components or units, as well as a confirmation key 21. This is basically used for the execution of the actions and/or for the confirmation thereof.

The machine is firstly brought into a starting state which is flagged for the machine control system as being the starting state for the subsequent teaching process. Then, by means of an action, at least one component, at least one unit or at least one peripheral device is transferred to a new position, to its new actual state, and this position is confirmed by means of the confirmation key. With the aid of the input by means of the confirmation key 21, the machine control system MS acknowledges the implemented action, commencing from the starting state up to the actual state reached by the action. It acquires the operating parameters, such as e.g. the position, the pressure or the force which arose as a result of moving the component or the unit to this location, in the control system, or recognizes these. By virtue of this acknowledgment, the action that has just been performed, such as e.g. a movement of an axis or a positioning process or the change that has occurred, is stored. This action occurs, triggered as far as possible by the machine control system, in that the operator either makes the changes manually or else, by using input means, he orders an action in the form of a functional movement which is implemented by the control system.

Functions such as movements or position-determining activities are programmed in that teaching actions, i.e. manually effective actions are implemented and this is programmed at the appropriate position in the cycle by the acknowledgment thereof after they have been implemented.

The process of defining the position or the function is done by either initiating it by means of push buttons on the machine whereby the execution of the action is assisted by the machine function, or—as is the case with handling systems for example—by a real manual movement from point A to point B by means of muscle power.

Next, there is a background check as to whether an input of this type is possible and the action that was effected by the movement of the component or the unit is added to the sequence of operations that is to be programmed as a new component so that this preferably manual process is adopted as a fixed constituent in the execution of the cycle. This check on the operational sequence has already been partially effected before the action has even taken place in order to enable e.g. a desired movement to be 'permitted' at all. Thus, for example, a handling system or a robotic arm is not allowed to enter the injection mold whilst it is still closed. In this case, the possible position is acquired and a symbol having an appropriate "residual" parameterization is inserted into the set of data e.g. in the form of preset speed parameters. This is effected e.g. by means of end switches on the axes. Basically, an action is only allowed if this action is permitted by the logical check on the function or the action that is to be inserted at the desired location. Then, starting from here, the appropriate linking conditions are made available to the operator in the form of further input possibilities or possible movements for the execution of further steps in order to complete the sequence of operations.

This process can be repeated as often as necessary, this thereby making it possible for complex processes to be programmed even with little knowledge of the control system. Thus, at this point, it is no longer necessary to have direct knowledge of the programming for the individual movements.

Starting from the confirmed position of the sequence of operations 18, the possible ways of implementation are then made available in the light of both the following and the preceding steps or sections of the sequence of operations. In principle, either an operational sequence can firstly be roughly established, an intervention position can be defined as the starting state, and from there, a component or a unit can be brought into an actual state of the machine so that further possible forms of implementation will be suggested by the machine control system MS and the action that has been carried out will be merged into the sequence of operations. Alternatively, a sequence of operations 18 or cycle can be produced alone in this way just by programming the actions of the different components or units of the injection molding machine or its peripheral equipment in a logical sequence. This latter possibility has the advantage that any actions which ought not to be carried-out in practice cannot in fact be performed on purely physical grounds alone (where one body is, the other cannot be). Machine operational sequences can also be produced by moving a component several times and/or by moving a plurality of components to different places. Hereby, the actual state that has been reached in one teaching process can be flagged as the starting state for a further teaching process.

Basically, those components of the machine's equipment or the machine's environment concerned here are each and every component or unit which can be controlled by the machine control system MS. This extends to both peripheral devices such as handling devices and equally so to components, units or axes of the injection molding machine itself, and also extends as far as the different basic operational functions such as e.g. opening of an injection mold, closing of an injection mold and tool axes such as e.g. core pullers.

It is also conceivable for the action to be in the form of a 'manual' twisting of the settings of the machine 14 or its peripheral equipment i.e. a process of altering the e.g. pressure, the ejector force, the temperature or of defining positions and then adopting these settings in the operational sequence of the machine in the form of a monitoring position. Usually, the preferred operating parameter is the path and the speed and acceleration associated therewith over time. The feedback to the machine is effected by means of the change in state/difference of the actuators and/or by sensors. Here, an actuator is defined as an element which converts an instruction into a mechanical movement.

Figure 2:
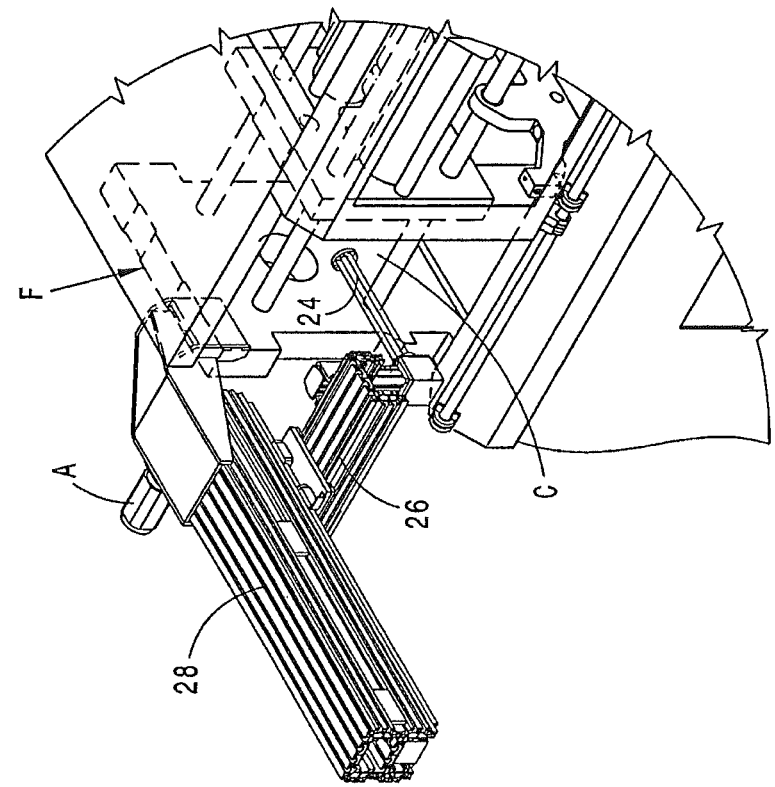
Figure 3:
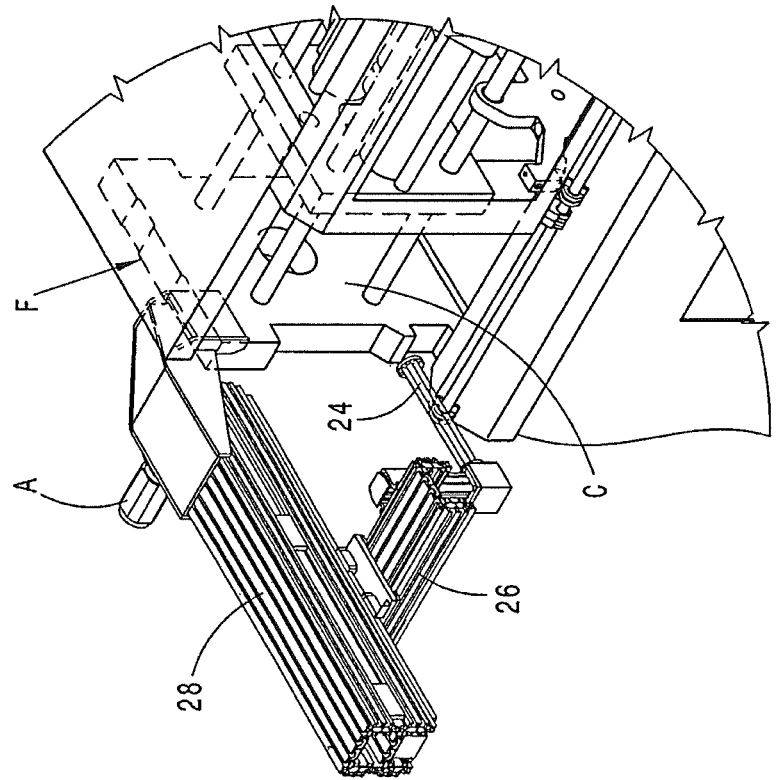

This is illustrated in FIGS. 2 and 3 for example. In contrast to FIG. 2, the lower carriage 26 with the gripper arm 24 in FIG. 3 has been shifted in the direction of the mold clamping chamber C of the mold closure unit F. This leads to a change in state which can be detected by a distance recorder or the position of the drive unit A.

The process of confirmation can be effected on the screen B by means of the input unit 10 provided in the machine 14 or by a separate unit such as the teaching unit 20 or by means of the keys shown on the screen B.

The entire control system can also be stored on a computer readable medium such as a data carrier containing instructions that are executable by a computer, the instructions being pre-recorded with a program for the execution of this method.

It is self evident that this description can be subjected to the most diverse modifications, changes and adaptations which fall within the scope of equivalents to the attached Claims.

The invention claimed is:

1. A method for an interactive control of a plastics injection molding machine, wherein operating parameters required for a sequence of operations of the machine are entered into a data processing unit storing these operating parameters in a form providing guidance to an operator, and subsequently one or more operational sequences are carried out in accordance with the said stored operating parameters, wherein the data processing unit has a set of data containing basic rules for the sequence of operations of the machine and wherein, as a result of employing the set of data and on a basis of possibilities presented by at least one of an equipment of the machine and its peripheral devices, a selected collection of possibilities for further sections of the sequence of operations which are insertable in compatible manner into existing sections of the sequence of operations is made available to the operator in a visualized form on a panel, wherein a section to be inserted is checked for adopting the section in the sequence of operations of the machine to be programmed and added thereto as a new component, the method further comprising:
manually performing an action, commencing from a starting state existing in the machine,
inputting the action into the data processing unit for a first logical check of the action as to a feasibility of performing the action,
performing the first logical check of the action as to the feasibility of the action;
determining whether the action is feasible;
performing the action if the action is feasible, wherein the machine is in an executable state because of and at the end of the action,
teaching the executable state that has occurred between the starting state and the executable state by a teaching unit for adopting the executable state into the sequence of operations of the machine that is to be programmed as a new component of the sequence of operations, checking the executable state in a second logical check regarding a possibility of use of the executable state to be an actual state regarding a connection to the existing sections of the sequence of operations, and adopting and performing the operating parameters at the executable state for an achieved position into the sequence of operations.

2. A method in accordance with claim 1, wherein the action and an entry of the operating parameters associated therewith is effected by moving at least one component or at least one unit of the machine or at least one peripheral device thereof from the starting state into a position corresponding to the actual state and by confirming this position for adopting it in the sequence of operations of the machine by means of the teaching unit.

3. A method in accordance with claim 1, wherein the action is effected by one of a manual operation or by a functional movement by means of an input unit or by means of the teaching unit.

4. A method in accordance with claim 3, wherein, in teaching the action by the functional movement and input by means of the input unit or by means of the teaching unit, the first logical check as to the feasibility of the action is effected whereby an illogical portion of the action is not permitted.

5. A method in accordance with claim 4, wherein, in the event that a result of the first logical check is that the action is only partially executable, a partial teaching process is effected and a remaining rest part of the action is buffered and/or rejected after contact with the operator.

6. A method in accordance with claim 1, wherein the possibilities are made available in form of possible manners of implementation commencing from a confirmed position in light of following and/or preceding steps of the sequence of operations.

7. A method in accordance with claim 6, wherein the possible manners of implementation are checked and made available commencing from the actual state.

8. A method in accordance with claim 1, wherein the operating parameters are at least one of path and time.

9. A method in accordance with claim 1, wherein the operating parameters are detected on a basis of at least one of a change in axes of the machine and of a change of actuators.

10. A method in accordance with claim 1, wherein a process of adoption into the sequence of operations that is to be programmed is effected after checking of the sequence of operations by means of the set of data containing the basic rules of the machine and of a procedural process and on the basis of the equipment of the machine and its peripheral devices whilst taking into consideration currently existing partial sequences.

11. A method in accordance claim 1, wherein the action is effected by at least one of multiple transfers of a component or a unit or a transfer of a plurality of components or units into different positions.

12. A method in accordance with claim 1, wherein the operational sequence is at least a partial sequence of a basic sequence function of the machine.

13. A method in accordance with claim 1, wherein the method is carried out in a cyclically working plastics injection molding machine and the sections are sections of a cycle.

14. A non-transitory computer readable medium comprising a program for the accomplishment of the method according to claim 1.

\* \* \* \* \*